United States Patent [19]
Kunoki

[11] Patent Number: 5,127,763
[45] Date of Patent: Jul. 7, 1992

[54] CLIP JOINT FOR CONNECTION OF REINFORCING BARS AND A WEDGE USED THEREIN

[76] Inventor: Soichi Kunoki, 360, Rivergate Way, Sacramento, Calif. 95831

[21] Appl. No.: 754,138

[22] Filed: Sep. 3, 1991

[51] Int. Cl.$^5$ ............................................. F16B 2/02
[52] U.S. Cl. ................................... 403/314; 403/393; 403/390; 403/374
[58] Field of Search ................ 403/314, 393, 390, 374

[56] References Cited

U.S. PATENT DOCUMENTS

| | | | |
|---|---|---|---|
| 748,056 | 12/1903 | Dulinsky | 403/314 |
| 2,092,372 | 9/1937 | Goeller | 403/390 X |
| 4,695,178 | 9/1987 | Era et al. | 403/314 X |
| 4,997,306 | 3/1991 | Kunoki | 403/314 X |

FOREIGN PATENT DOCUMENTS

| | | | |
|---|---|---|---|
| 684744 | 12/1939 | Fed. Rep. of Germany | 403/390 |
| 728691 | 4/1955 | United Kingdom | 403/393 |

Primary Examiner—Andrew V. Kundrat
Attorney, Agent, or Firm—Joseph C. Mason, Jr.; Ronald E. Smith

[57] ABSTRACT

Joints having utility in connecting together concrete reinforcing bars are improved by adding teeth to preselected interior side walls of the joint to increase the frictional engagement between the rebars and the joint. In a first embodiment, the joint is of oblong construction and includes a pair of flat, parallel walls and a pair of transversely spaced, opposing curved walls that interconnect the flat walls. Plural, parallel rows of elongate teeth are formed in the interior surfaces of the curved walls, and the teeth are normal to the plane of the flat walls. Each flat wall is apertured and receives a wedge that drives the rebars in the joint away from one another and into the teeth. In a second embodiment, the joint has an elongate "U" shape including a pair of transversely spaced flat walls interconnected by a curved wall and plural parallel rows of elongate teeth are formed in the interior surface of the curved wall. Plural apertures are formed along the length of the flat walls and receive wedge members that drive axially aligned rebars into the teeth. A third embodiment includes a flat plate that interconnects the free ends of the flat walls of the second embodiment to secure them against movement. A first improved wedge member includes an insertion depth limiting base member and a second improved wedge includes a prominence on the trailing end of the depth limiting base member.

10 Claims, 5 Drawing Sheets

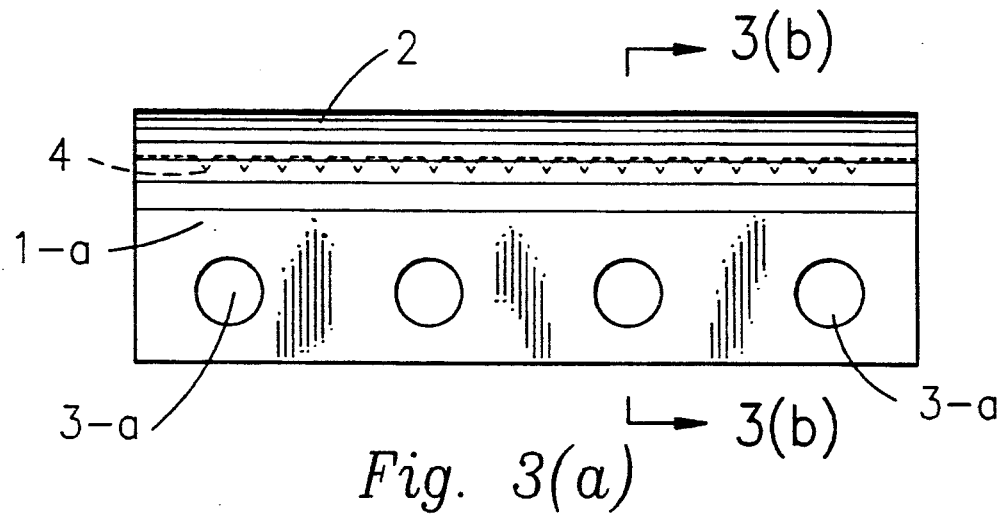
*Fig. 3(a)*
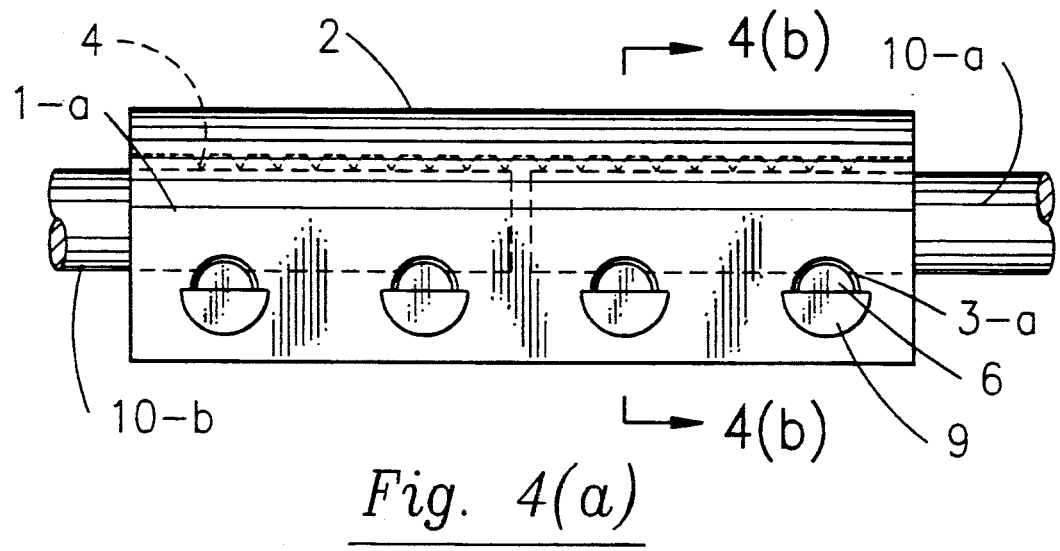
*Fig. 4(a)*
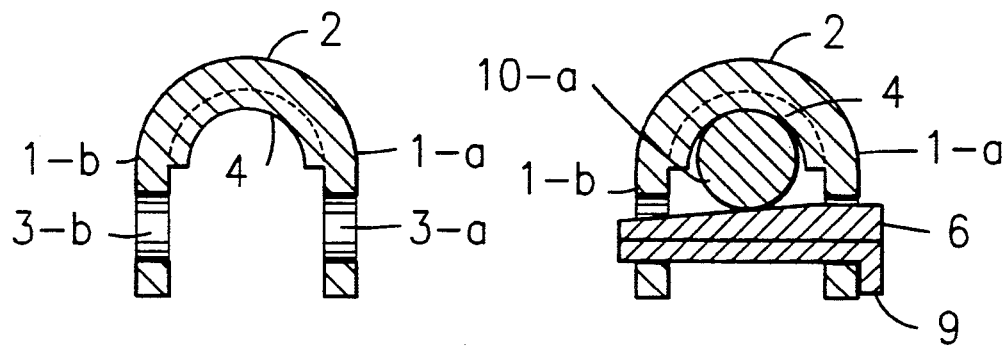
*Fig. 3(b)*     *Fig. 4(b)*

CLIP JOINT FOR CONNECTION OF REINFORCING BARS AND A WEDGE USED THEREIN

BACKGROUND OF THE INVENTION

1. Field of the Invention

This invention relates, generally, to devices that hold concrete reinforcing bars to prevent them from slipping. More particularly, it relates to a joint that includes a wedge and teeth to firmly grip said bars.

2. Description of the Prior Art

Concrete reinforcing bars are more commonly known as rebars. They are used in the construction industry in footers and in other concrete applications to strengthen the concrete.

Rebars often slip out of position when concrete is poured, and their effectiveness is thereby reduced. Accordingly, inventors have created devices designed to hold rebars against movement. Examples of earlier work in this field are shown in U.S. Pat. Nos. 4,695,178 and 4,997,306.

FIG. 8 of the present disclosure shows a prior art rebar joint of oblong construction that holds the leading end of a first rebar 10-a and the trailing end of a contiguous rebar 10-b in parallel relation to one another. A pair of axially aligned bores 3-a, only one of which is shown, are formed in the joint 2 and a wedge 6 is driven into said bores after the rebars have been inserted into the open opposite ends of the joint. The wedge drives each rebar into frictional engagement with an internal side wall of the joint.

The FIG. 8 joint is more effective than no joint at all, but it has been found that the rebars still slip at least to some extent when the joint is in use. How such slippage could be overcome is not apparent to those of ordinary skill in this art.

A second prior art joint is shown in FIG. 9. This joint 2 receives rebars 10-a and 10-b in axial alignment with one another. Joint 2 has a "U" shape and includes elongate parallel side walls 1-a and 1-b having a plurality of cooperatively aligned bores 3-a and 3-b formed along the longitudinal extent thereof, respectively. Each of said bores receives a two part wedge having a first part denoted 6 and a second part denoted 9. Part 9 is flanged to limit the depth of its penetration.

In both of these prior art embodiments, the application of an axially directed tensile force to the joined rebars that is far below the tensile strength of the rebars will successfully pull the rebars from the joint.

Note in FIGS. 8 and 9 that the surfaces of the rebars are somewhat smooth. Rebars having rougher surfaces have been tried, in the hope that the frictional force between a rough surface and the inside walls of the joints might increase, but the opposite has been found to be true, i.e., when a pair of rough surface rebars are joined in the devices of FIGS. 8 and 9, even less axially directed tensile force is required to separate them from the joint. This is because the amount of surface area available for frictional contact is even less when rough rebars are joined. Thus, the problem of joining rebars together appears intractable and those of ordinary skill in the art have been unable to solve it.

The prior art, when considered as a whole in accordance with the requirements of law, neither teaches nor suggests to those of ordinary skill in this art how the seemingly intractable problem of rebar slippage could be solved.

SUMMARY OF THE INVENTION

The longstanding but heretofore unresolved limitations of the rebar joints of the prior art are now overcome by the improved rebar joints of this invention.

In a first embodiment, plural teeth are added to the interior walls of an oblong joint. Each tooth is elongate and semicircular in configuration so that it wraps partially around a rebar. There are plural rows of such semicircular teeth so that the interior side walls of the joint are covered with said teeth along almost the entire longitudinal extent thereof. A wedge driven into a central aperture that is formed in the joint drives the rebars in the joint away from one another and into frictional engagement with the teeth.

In a second embodiment, plural rows of semicircular teeth are formed along the bight part of a "U"-shaped joint designed to hold rebars in axial alignment with one another and plural wedges extend through bores formed in said joint along the longitudinal extent thereof.

A third embodiment improves the second embodiment by joining the free ends of the joint together with a plate that extends the entire longitudinal extent thereof and which holds the free ends of the joint against movement. The third embodiment also introduces use of a half-wedge member.

The present invention also includes improvements in wedges; the improved wedges have means for limiting their depth of insertion so that variations in insertion depth among numerous rebar joints is eliminated. An improved wedge for use with a certain type of wedge-driving tool is also disclosed.

A primary object of the present invention is to advance the art of rebar joints by providing innovative joints that have increased frictional resistance between the respective rebars and inner side walls of the joints.

Another important object is to provide improved wedges for use in rebar joints.

Still another object is to provide a rebar joint that holds rebars against longitudinal displacement even when axially imparted tensile forces approaching the tensile strength of the rebars is exerted thereagainst.

These and other important objects, features and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 3(a) is a side elevational view of a second embodiment of the novel rebar;

FIG. 3(b) is a transverse sectional view taken along line B—B in FIG. 3(a);

FIG. 4(a) is the same view as FIG. 3(a), but showing a pair of axially aligned rebars disposed within the joint;

FIG. 4(b) is a transverse sectional view taken along line B—B in FIG. 4(a);

Similar reference numerals refer to similar parts throughout the several views of the drawings.

DETAILED DESCRIPTION OF THE PREFERRED EMBODIMENT

Figures 1A, 1B:
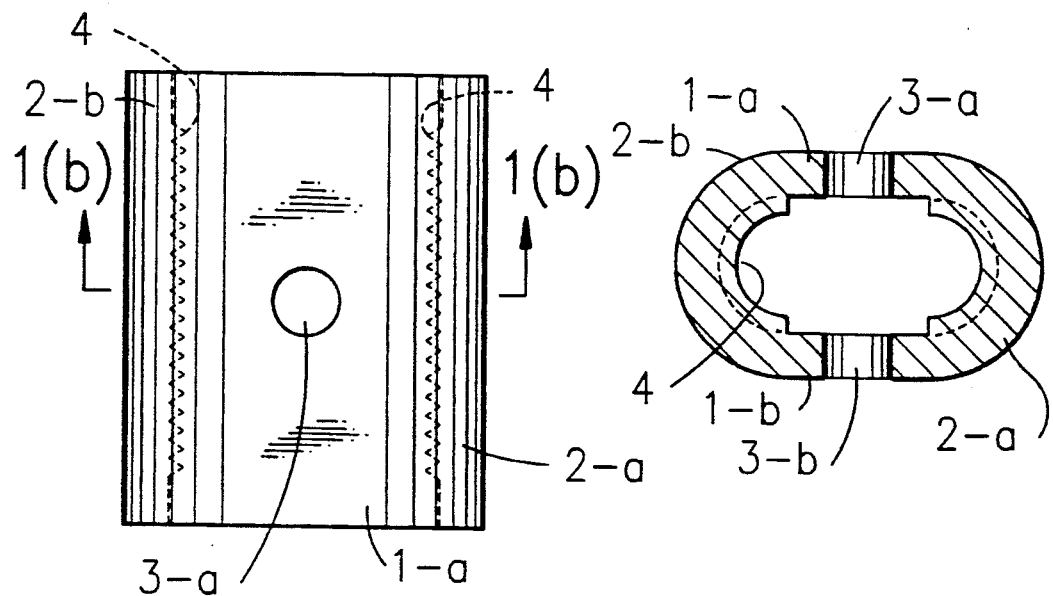
FIG. 1(a) is a front elevational view of a first embodiment of the novel rebar joint.
FIG. 1(b) is a transverse sectional view taken along line A—A in FIG. 1(a)

Referring now to FIGS. 1-a and 1-b, it will there be seen that this first embodiment of the joint is generally tubular. More particularly, it has a main body of oblong configuration, i.e., it has a major axis defined by parallel, flat walls i-a and 1-b and a minor axis defined by curved walls 2-a, 2-b that interconnect the flat walls. Each curved wall forms a return bend and is integral with both flat walls.

A plurality of projections or teeth 4 are formed on the respective inner side walls of each curved wall. Each tooth forms a return bend as shown in FIG. 1-b. As best understood in connection with FIG. 1-a, each tooth 4 is parallel to its contiguous teeth and all teeth are orthogonally disposed with respect to the plane of flat walls 1-a, 1-b, i.e., each tooth is normal to the longitudinal axis of the joint.

Throughbore 3-a is formed in flat wall 1-a, centrally thereof, and throughbore 3-b is similarly formed in flat wall 1-b so that said bores are in axial alignment with one another.

Figures 2A, 2B:
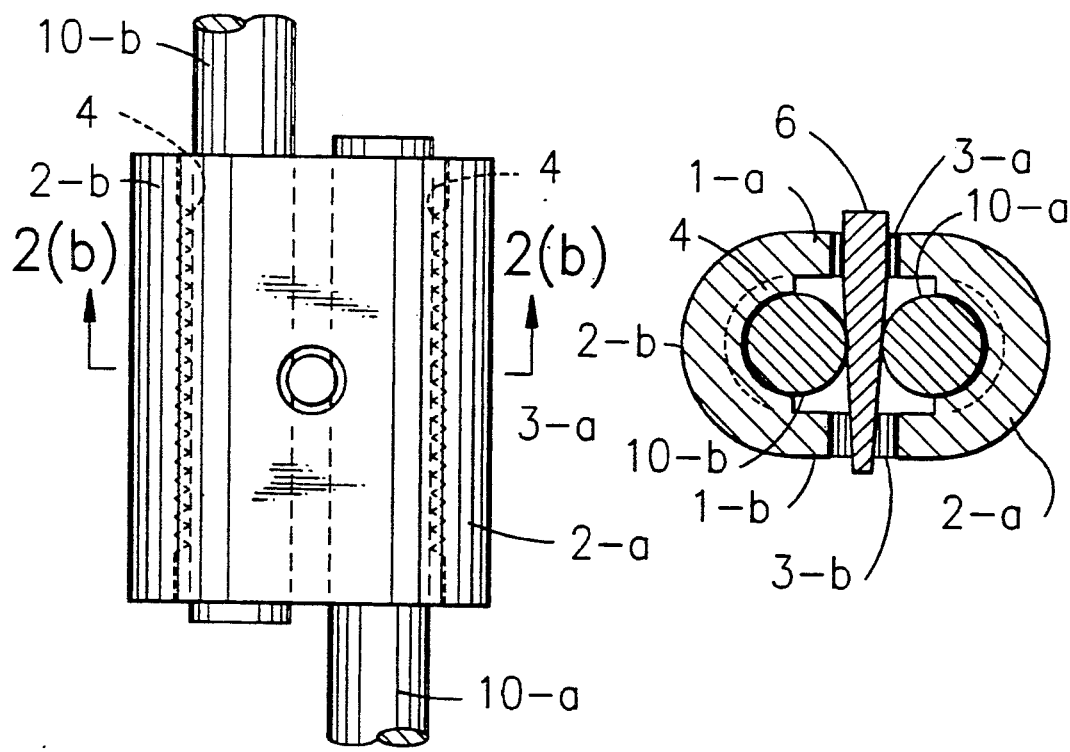
FIG. 2(a) is the same as FIG. 1(a), but showing a pair of parallel rebars disposed within the joint.
FIG. 2(b) is a transverse sectional view taken along line A—A in FIG. 2(a)

Rebars 10-a and 10-b are shown locked within the joint in FIGS. 2(a) and 2(b). The joint is open at both of its ends; rebar 10-a is slidably inserted into a first open end of the joint and rebar 10-b is slidably inserted into a second open end thereof. Note that the amount of overlap of said rebars is substantially equal to the longitudinal extent of the joint.

To drive each rebar against its associated teeth, a tapered wedge 6 is positioned between the rebars as depicted in FIG. 2(b); note that said wedge extends through throughbores 3-a and 3-b and its tapered surfaces bear against the respective rebars, driving them away from one another and into their associated teeth 4. Thus, advancing the wedge 6 further drives the rebars even more tightly into said teeth.

Reference should now be made to FIGS. 3(a), 3(b), 4(a), and 4(b) where a second embodiment of the novel joint is depicted. This second embodiment is an elongate main body member having a "U" shape when seen in end view or in transverse section. The bight of the "U" is denoted 2 in the FIGS. and its opposite ends are integral with parallel, transversely spaced apart flat walls 1-a, 1-b. A plurality of equidistantly and longitudinally spaced throughbores 3-a are formed in flat wall 1-a and a plurality of cooperatively aligned throughbores 3-b are similarly formed in flat wall 1-b. A plurality of parallel, arcuate teeth 4 are formed on curved wall 2; note that said teeth are transversely disposed with respect to the longitudinal axis of this embodiment of the novel joint.

FIG. 4(a) depicts how this joint joins together a pair of rebars 10-a, 10-b; note that said rebars are in axial alignment with one another, thereby contrasting with the parallel but offset arrangement of rebars in the first embodiment. For best results, the rebars should abut one another about mid-length of the joint, as shown.

Figure 9:
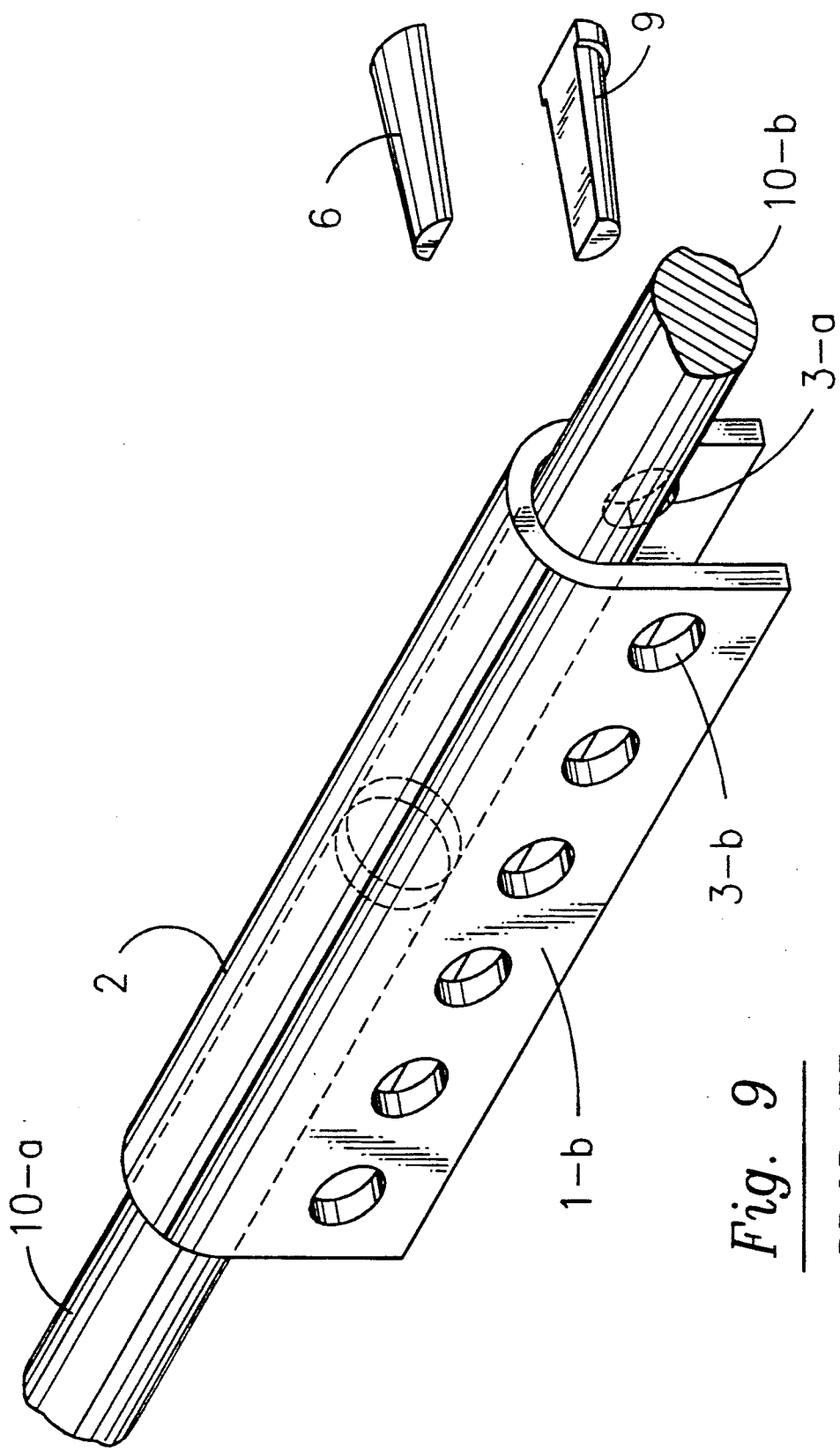
FIG. 9 is a perspective view of a "U"-shaped joint of the prior art.

A two part wedge member is then inserted into each throughbore 3-a, 3-b as best shown in FIG. 4(b). Each wedge includes parts 6 and 9; part 9 is a base or a guide means for part 6. Part 6 is semicircular in transverse section, as shown in FIG. 9, and is tapered so that it increasingly bears against its associated rebar as it is driven through said throughbores, thereby increasingly driving the rebar into teeth 4. Part 9 of the wedge, which is also semicircular in transverse section, has a depending flange formed therein as shown; the flange limits the depth of penetration of the wedge as is clear from FIG. 4(b). Note that each rebar is wedged by two wedge members in this embodiment; however, any number of wedges per rebar are within the scope of this invention.

Figure 5A:
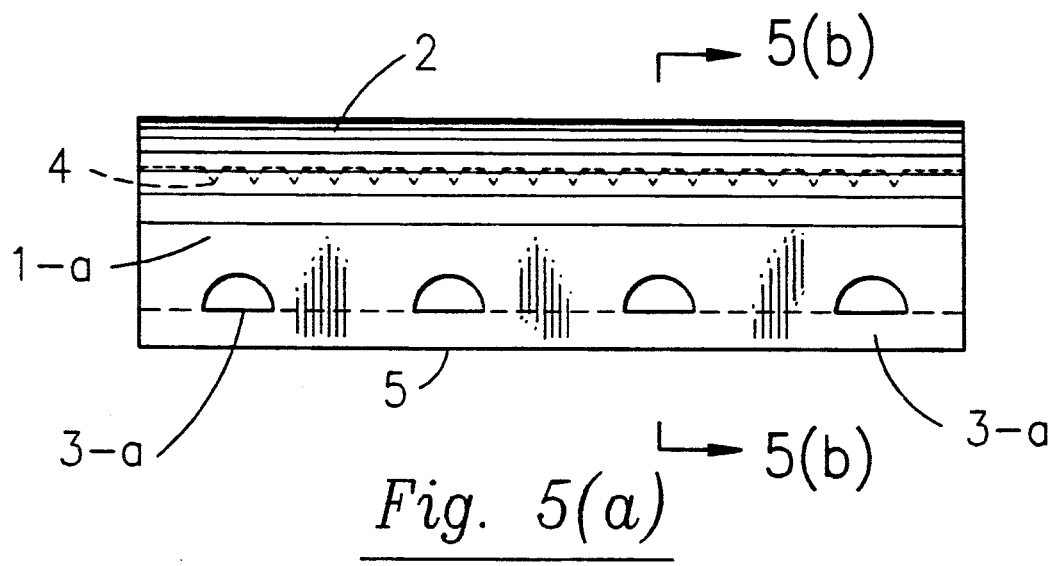
FIG. 5(a) is a side elevational view of a third embodiment of the novel rebar.
Figure 5B:
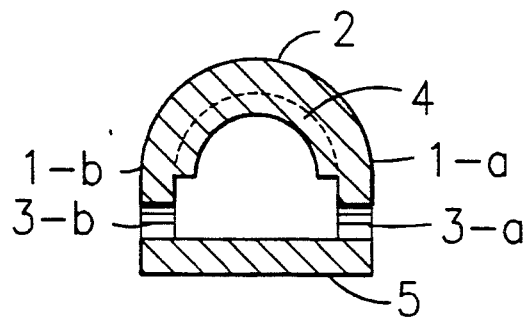
FIG. 5(b) is a transverse sectional view taken along line C—C in FIG. 5(a)

A third embodiment is depicted in FIGS. 5(a) and 5(b). As in the second embodiment, this joint has a "U" shape and a predetermined longitudinal extent. Thus, it includes curved wall 2 having transversely disposed, longitudinally spaced teeth 4 formed therein, and a pair of parallel, transversely spaced apart flat walls 1-a, 1-b having throughbores 3-a, 3-b formed therein, respectively, at longitudinally spaced intervals along the extent thereof. This embodiment differs from the second, however, because the ends of the flat walls are not free. More particularly, said ends are interconnected by an elongate, flat plate 5 that has a longitudinal extent common to the longitudinal extent of the joint. Plate 5 prevents walls 1-a, 1-b from diverging from one another when a wedge is driven through throughbores 3-a, 3-b as in the second embodiment. Note in FIG. 4(b) that flat wall 1-b may diverge from flat wall 1-a as the wedge is driven into the throughbores, and that said divergence could weaken the grip of teeth 4 on their associated rebars. Thus, plate 5 prevents such divergent motion and enhances the grip on the rebars.

Plate 5 also eliminates the need for the base or guide part 9 of the wedge; thus, only tapered part 6 of the wedge is needed as should be clear from an inspection of FIGS. 5(a) and 5(b). This saves the time required to insert the base part 9 of the wedge. Also, it is easier to insert part 6 when wall 5 serves as the guide.

Figures 6A, 6B:
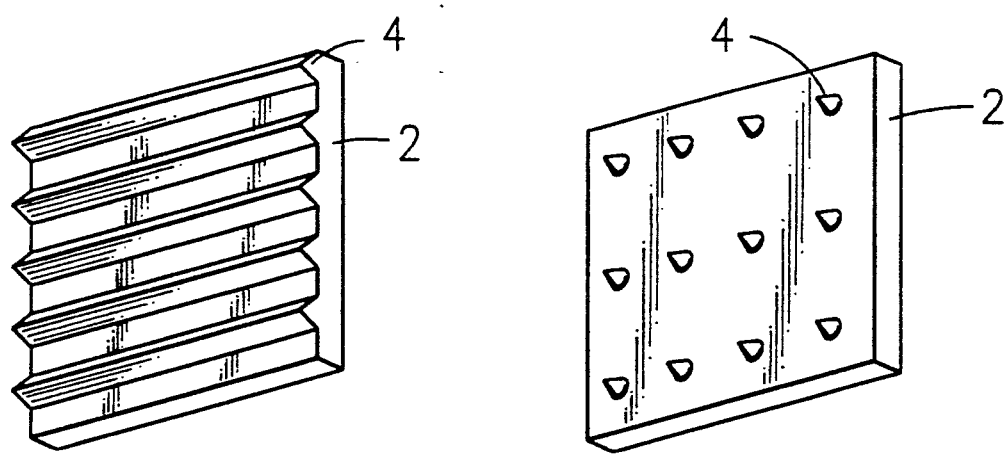
FIG. 6(a) is a perspective view of one embodiment of teeth.
FIG. 6(b) is a perspective view of a second embodiment of teeth.

Teeth 4 may be provided in many different geometric configurations. In FIG. 6(a), teeth 4 have the configuration of an isoceles triangle when seen in end view or transverse section; in FIG. 6(b), teeth 4 are provided in conical form. Examples of other forms that would have utility include pyramidal, trapezoidal, frusto-conical, and so on, without limitation.

Moreover, the spacing between or particular pattern between teeth and the range over which the teeth are positioned may be varied as well within the scope of this invention. For example, note the spacing between the rows of teeth in FIG. 6(a) and compare that spacing with the more condensed spacing shown in FIG. 1(a).

The curved wall 2 within which teeth 4 are formed is shown in a flattened configuration in FIGS. 6(a) and 6(b) to better depict the teeth.

Figure 7A:
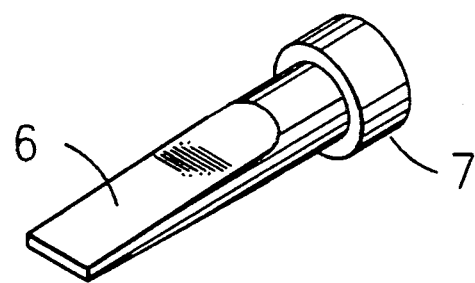
FIG. 7(a) is a perspective view of a first embodiment of the novel wedge.
Figure 7B:
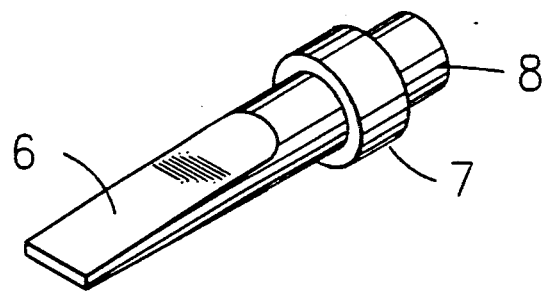
FIG. 7(b) is a perspective view of a second embodiment of the novel wedge.
Figure 8:
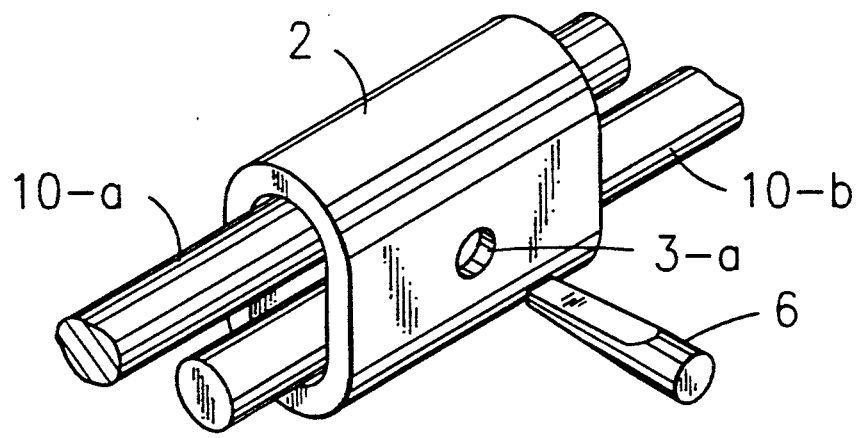
FIG. 8 is a perspective view of an oblong-type joint of the prior art.

Improved wedge members are shown in FIGS. 7(a) and 7(b). In FIG. 7(a), a cylindrical base 7 is positioned at the base or proximal end of wedge 6. The diameter of base 7 is greater than the diameter of throughbores 3-a, 3-b so that the base acts as a means for limiting the depth of insertion of wedge 6 into a throughbore, i.e., base 7 is a stopper means. Importantly, base 7 is specifically positioned so that when its leading edge abuts a flat wall 1-a or 1-b, the wedge 6 will be inserted within its associated throughbore at the optimal depth. This prevents overinsertion of the wedge; in prior art wedges, the wedge is often driven into its throughbore until the head of the wedge is flush with the surface of the flat wall of the joint. Such overinsertion is undesirable because it overly stresses the joint and may cause joint failure.

Another embodiment that prevents overinsertion of the wedge 6 is shown in FIG. 7(b); it also includes base 7 that limits penetration, and it includes a solid cylindrical protuberance or prominence 8 as well. Prominence 8 is in axial alignment with base 7 and wedge 6 and has a diameter substantially smaller than base 7 as shown. Prominence 8 has utility when a tool having a "C"-shaped arm is used to drive the wedge into its associated throughbores. When such a tool is used, a first end of the "C"-shaped arm is positioned in abutting relation to the flat head of the wedge and the opposite end of the "C"-shaped arm is placed in the opposing throughbore, i.e., the throughbore that is in alignment with the throughbore that receives the leading (narrow) end of the wedge. Pressure is then applied to press the wedge into the throughbores. A rubber adapter grasps the flat head of the wedge during the above-described procedure. The adapter is recessed to receive the flat head of the wedge; in the wedge of FIG. 7(a), note that if base 7 is received within an adapter that is recessed to receive said base 7, then a peripheral wall of the adapter will circumscribe said base 7. That peripheral wall often becomes stuck in the throughbore when the wedge is driven in. By providing the prominence 8, the rubber adapter receives the prominence within said recess instead of the base 7, with the result that the leading edge of the adapter cannot enter into a throughbore. Thus, prominence 8 may be thought of as a spacer means for keeping the adapter away from the throughbore.

The materials from which the novel joints are made may be the same as the materials employed in the joints of the prior art, e.g., steel, iron, cast iron, carbon steel, or any other suitable material. The dimensions of the novel joints are also about the same as the earlier joints. For example, the oblong first embodiment is preferably about 52 mm across, about 60 mm in length, and 33 mm in depth. The walls thereof are about 6 mm thick and the teeth 4 are about 1.7 mm in height. The "U"-shaped joints of the second and third embodiments are about 33 mm in width, 35 mm in depth, and about 120 mm in length. The wall thickness and the height of the teeth is the same as the first embodiment. These dimensions work well where rebars having a nominal diameter of about 16 mm are joined together.

Some experimental tests have been conducted where rebars having a nominal diameter of 19 mm were joined with joints having a slightly larger size than the above-described joints. A joint made in accordance with the teachings of the first embodiment and having a width (major axis) of 64 mm, a depth (minor axis) of 43 mm, and a length of 80 mm was used to join together these 19 mm in diameter rebars. The joint had a wall thickness of 7 mm, and teeth 4 were of the equilateral triangular form as shown in FIGS. 1-a and 2-a, and each side thereof was 2 mm in extent. Nineteen rows of curved teeth 4 were used, also as shown in FIGS. 1-a and 2-a, and no teeth were formed within 4 mm of each open end of the joint. A 2 mm interval was provided between each row of teeth, such as depicted in FIG. 6(a). The rebars were inserted into opposite ends of the joint as shown in FIG. 2-a, and a wedge was driven into throughbores 3-a, 3-b under 7-8 tons of pressure, and an axial force was applied to each rebar in an attempt to pull it from the joint. The rebars broke at about 90% of their rated maximum tensile strength; the joint held and no slippage was observed. When the same test was applied to the joints of the prior art, the bars slipped, i.e., the joints failed, when the tensile force applied to the rebars was about 50-70% of their maximum tensile strength.

This invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

I claim:

1. A joint for joining rebars, said joining having an oblong main body including a pair of parallel flat walls interconnected by a pair of curved walls that form a return bend, each of said flat walls having a throughbore formed therein, substantially centrally thereof so that opposing throughbores are in axial alignment with one another, a plurality of teeth members formed on an inner side wall of said curved walls, each of said teeth members being curved and disposed in parallel relation to one another, and each of said teeth members being orthogonally disposed with respect to a longitudinal axis of said joint.

2. The joint of claim 1, further comprising a tapered wedge member that is axially insertable into said opposing throughbores and is positionable between a pair of rebars disposed therewithin, said wedge member driving said rebars away from one another and into their associated teeth members to thereby increase the amount of frictional engagement between said teeth members and said rebars.

3. A joint for joining rebars, said joint having an elongate "U"-shaped main body, said main body including a pair of transversely spaced apart parallel flat walls of predetermined longitudinal extent that are interconnected by a bight part of common longitudinal extent, and said bight part having formed therein a plurality of teeth members, each of said teeth members forming a return bend and each of said teeth members being parallel to one another and all of said teeth members being transversely disposed with respect to a longitudinal axis of said main body.

4. The joint of claim 3, further comprising a plurality of throughbore formed in both of said flat walls along the longitudinal extend thereof, each of said throughbore being in axial alignment with an opposing throughbore.

5. The joining of claim 4, further comprising a plurality of tapered wedge members, each of said wedge members being adapted to be driven into an associated pair of axially aligned throughbores, each of said wedge members bearing against a rebar positioned within said joint and driving said rebar toward said teeth members formed in said bight part of said joint.

6. The joint of claim 3, further comprising an elongate flat plate that is fixedly secured to and that interconnects the free ends of said flat walls.

7. The joint of claim 6, further comprising a plurality of throughbores formed in both of said flat walls along the longitudinal extent thereof, each of said throughbores being in axial alignment with an opposing throughbore, and each of said throughbores having a semicircular configuration, said flat plate defining a flat part of each of said throughbores.

8. The joint of claim 7, further comprising a plurality of tapered wedge members, each of said wedge members having a semicircular cross sectional configuration that matches the cross sectional configuration of its associated throughbore.

9. The joint of claim 2, wherein each of said wedge members further includes a base member having a diameter greater than a diameter of said throughbore, said base member being positioned at a proximal end of its associated wedge member and said base member having a leading edge that abuts a side wall of said joint to limit penetration of said wedge member into its associated throughbore, said leading edge being positioned relative to said wedge member so that said wedge member is positioned at its optimal depth when said leading edge abuts its associated flat wall.

10. The joint of claim 9, further comprising a prominence formed in axial alignment with said wedge member at a trailing end of said base member, said prominence having a diameter less than the diameter of said base member and said prominence having utility in facilitating insertion of a wedge member through its associated throughbores.

* * * * *